US011897131B2

(12) United States Patent
Alatorre Troncoso et al.

(10) Patent No.: US 11,897,131 B2
(45) Date of Patent: Feb. 13, 2024

(54) ACTUATOR (71) Applicant: ROLLS-ROYCE PLC, London (GB)

(72) Inventors: David Alatorre Troncoso, Nottingham (GB); Dragos Axinte, Nottingham (GB); James Kell, Nottingham (GB)

(73) Assignee: ROLLS-ROYCE plc, London (GB)

( * ) Notice: Subject to any disclaimer, the term of this patent is extended or adjusted under 35 U.S.C. 154(b) by 46 days.

(21) Appl. No.: 17/736,558

(22) Filed: May 4, 2022

(65) Prior Publication Data
US 2022/0371182 A1 Nov. 24, 2022

(30) Foreign Application Priority Data

May 18, 2021 (GB) ..................................... 2107053

(51) Int. Cl.
| B25J 9/12 | (2006.01) |
| B25J 9/10 | (2006.01) |
| B25J 9/06 | (2006.01) |
| B25J 13/02 | (2006.01) |
| B25J 13/08 | (2006.01) |
| B25J 18/06 | (2006.01) |
| B25J 19/00 | (2006.01) |

(52) U.S. Cl.
CPC ............. *B25J 9/1075* (2013.01); *B25J 9/065* (2013.01); *B25J 9/12* (2013.01); *B25J 13/02* (2013.01); *B25J 13/088* (2013.01); *B25J 18/06* (2013.01); *B25J 19/0025* (2013.01)

(58) Field of Classification Search
CPC ........... B25J 18/06; B25J 9/065; B25J 9/1075
See application file for complete search history.

(56) References Cited

U.S. PATENT DOCUMENTS

| 4,255,762 | A | 3/1981 | Takeyasu et al. |
| 10,670,538 | B2 | 6/2020 | Morris |
| 2010/0191053 | A1 | 7/2010 | Garcia et al. |
| 2011/0034943 | A1 | 2/2011 | Churchill et al. |
| 2014/0114327 | A1 | 4/2014 | Boudreaux et al. |

(Continued)

FOREIGN PATENT DOCUMENTS

| EP | 1380319 A1 | 1/2004 |
| EP | 2 189 103 A1 | 5/2010 |

(Continued)

OTHER PUBLICATIONS

Oct. 17, 2022 Search Report issued in European Patent Application No. 22171336.5.

(Continued)

*Primary Examiner* — Randell J Krug
(74) *Attorney, Agent, or Firm* — Oliff PLC (57) ABSTRACT

A universal actuator for driving a continuum arm robot having a plurality of tendons includes; a housing; a power supply pack with a power source; a control pack with an industrial programmable logic controller, a screen, a rotary encoder linked to an analogue input device, a digital output device, a plurality of electronic control cards that connect the programmable logic controller to a user input device, the rotary encoder and an actuator pack for controlling the motion of the continuum arm robot, the programmable logic controller or the screen having a computer program to allow for set up and control of the continuum arm robot.

18 Claims, 11 Drawing Sheets

(56) References Cited

U.S. PATENT DOCUMENTS

2017/0234734 A1   8/2017  Sakami et al.
2019/0054638 A1   2/2019  Norton et al.
2020/0319119 A1  10/2020  Peters et al.

FOREIGN PATENT DOCUMENTS

| EP | 3123922 A1 | 2/2017 | |
|---|---|---|---|
| KR | 10-2015-0044065 A | 4/2015 | |
| WO | 2006/053198 A2 | 5/2006 | |
| WO | WO-2006053198 A2 * | 5/2006 | ......... A61B 1/00128 |
| WO | 2010/001124 A2 | 1/2010 | |
| WO | 2013/116490 A1 | 8/2013 | |
| WO | 2015/048700 A2 | 4/2015 | |
| WO | 2019/212821 A1 | 11/2019 | |

OTHER PUBLICATIONS

Feb. 21, 2023 U.S. Restriction/Election Requirement issued U.S. Appl. No. 17/736,524.
Aug. 1, 2023 Office Action Issued In U.S. Appl. No. 17/736,524.
Sep. 28, 2021 Search Report issued in British Patent Application No. 2107053.7.
Oct. 20, 2021 Search Report issued in British Patent Application No. 2107055.2.
U.S. Appl. No. 17/736,524, filed May 4, 2022 in the name of James Kell et al.
Oct. 18, 2022 Extended Search Report issued in European Patent Application No. 22171337.3.
Nov. 16, 2023 Office Action issued in U.S. Appl. No. 17/736,524.

\* cited by examiner

ACTUATOR

FIELD OF THE DISCLOSURE

The disclosure relates to a universal actuator for a continuum arm robot. The disclosure further relates to a continuum arm robot having a universal actuator with interchangeable continuum arms.

BACKGROUND OF THE DISCLOSURE

Continuum arm or snake arm robots are of growing interest in a number of different and divergent fields of technology. They may be used for example in the inspection and repair of complex systems such as gas turbine engines or nuclear reactors, or alternatively they can be used in surgical operations on the human body. The benefit of the system is the control that is provided by the use of a rigid compliant arm, which means it is able to access areas which would be difficult or dangerous for a human to enter without potential significant damage to the surrounding areas. Continuum arm robots comprise an arm, which consists of a number of joints the stiffness of which can be set when the robot is built to provide the robot with the requisite strength and flexibility to perform its desired task. The joints are typically manipulated by tendons which run through the joint and can be tensioned or relaxed as required by an operator. The operator controls the degree of tensioning within the arm through the use of an actuator. Each continuum arm robot is provided with its own actuator for controlling the arm and the head that is attached to the arm to provide the tooling or inspection equipment as required.

As such, in use a plurality of continuum robots may be required to complete the requisite task. This is because the robots may need different heads if the task is a complex process or alternatively, they may require different stiffness of joints. This requirement for having a plurality of different continuum arm robots increases the cost and complexity of the process, as each step a different continuum arm robot needs configuring and once the process is completed it needs to be removed and the next continuum arm robot needs to be configured. This therefore increases the cost through the requirements of a possessing a number of different continuum arm robots and their associated actuators and the operator time in changing and setting up the different continuum arm robots. It is therefore desirable to improve the operation of the continuum arm robots and their actuators.

SUMMARY OF THE DISCLOSURE

The present disclosure provides a universal actuator for driving a continuum arm robot having a plurality of tendons, the universal actuator comprising; a housing; a power supply pack comprising a power source; a control pack comprising an industrial programmable logic controller, a screen, a rotary encoder linked to an analogue input device a digital output device, a plurality of electronic control cards that connect the programmable logic controller to a user input device, the rotary encoder and an actuator pack for controlling the motion of the continuum arm robot, the programmable logic controller or the screen having a computer program to allow for set up and control of the continuum arm robot; wherein the actuator pack is coupled to an electronic control card that is linked to the control pack, the actuator pack comprising a plurality of actuators, each actuator being coupled to its own load cell and servo drivers; the actuator pack has a connection port, the connection port having a hole through which tendons of the continuum arm robot pass through in order to be connected to their associated actuator and a coupler for allowing secure attachment and removal of the continuum arm robot; and each actuator of the plurality of actuators has a removable attachment of the tendons of the continuum arm robot.

Each actuator may have a connector which has a slot for engaging with a ferrule mounted to the tendon of the continuum arm robot. The connector may be a spool that engages with actuator and features a narrow diameter centre for wrapping the tendon of the continuum arm root around and a slot for engaging with the ferrule on the tendon of the continuum arm robot.

The plurality of actuators may be mounted in groups, each group being connected to a frame which also hosts the drive electronics for control of the actuator.

The plurality of actuators may be brushless servo motors.

The load cell associated with each actuator may be coupled to an operational amplifier, which is linked to the servo driver, which in turn is linked to the actuator.

A position sensor may be present to determine the location of the continuum arm robot and to provide feedback back to the programmable logic controller.

The actuator may be provided with an LED driver, the LED driver being coupled to LEDs present within the continuum arm robot to provide illumination of a desired area around a distal end of the continuum arm robot.

The rotary encoder may be a rotary incremental encoder that is linked to a encoder interface, which is linked in series to the analogue input device and to the digital output device.

The electronic control cards may be EtherCAT cards.

The actuator may be provided with a twist and feed mechanism.

The screen may be a touch screen device.

The user input device may be a joystick.

The actuator may be provided with a plurality of temperature sensors.

The actuator may be provided with a plurality of indicator LEDs.

The universal actuator may have a ventilation system. The ventilation system may be provided by a plurality of fans.

The universal actuator may be provided with a shut-down button.

According to a second aspect of the invention there is provided a continuum arm robot comprising a plurality of interchangeable continuum arm sections and a universal actuator as discussed above.

Each arm may be between 0.5 and 10 m in length.

Each arm may have a thickness between 3 and 30 mm.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1A:
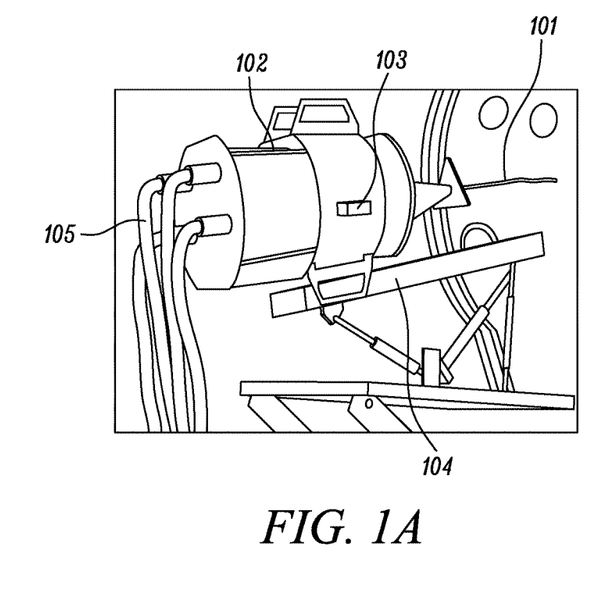
FIG. 1a presents a cut away example of an actuator for a continuum arm robot according to the prior art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint; this, allows the continuum arm to bend. The actuator pack is shown being positioned on a rail or support 104, which is positioned close to the component that is to be inspected. The actuator is also provided with a plurality of power and signal cables 105 that are used to power and address the actuators. The individual signals across the range of actuators provide control of the joints such that the continuum arm 101 can be directed. Not shown in FIG. 1, is that there is also a need for an operator with a computing device that is linked to the actuator to control movement of the continuum arm and to perform the desired task. As the continuum arm is permanently integrated into the actuator if a different tool is required it requires the use of a complete continuum arm robot system including the actuator. The computing device that is connected to the prior art actuator may be any suitable computing system such as a laptop computer featuring the requisite operating software for the robot and a control input such as a joystick, which allows the continuum arm to be controlled.

Figure 1B:
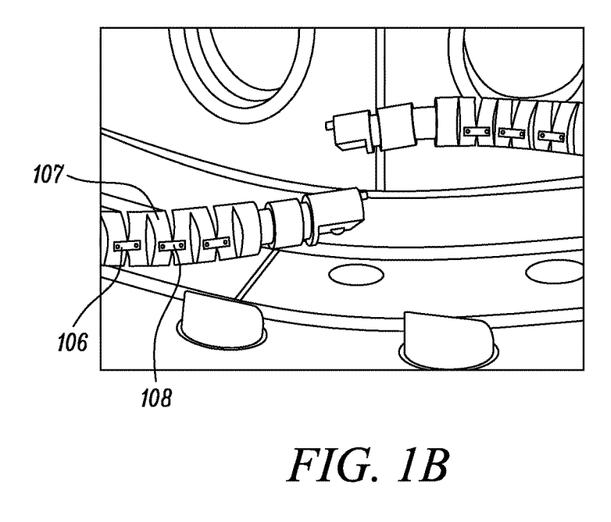
FIG. 1b presents an image of a prior art continuum arm robot in use.

FIG. 1B shows an example of the joints of a continuum arm robot. The arm comprise multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets characteristics such as the minimum bending radius and the requirements for the torque that is required to cause a resultant change within the joint. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables usually are able to run through the centre of the joints within the continuum arm. This has the benefit of protecting the cables form any potential damage. All of these components as well as the arm structure are permanently coupled to the actuator; this means that if the arm fails or has a problem the entire continuum arm robot needs to be replaced.

Figure 2:
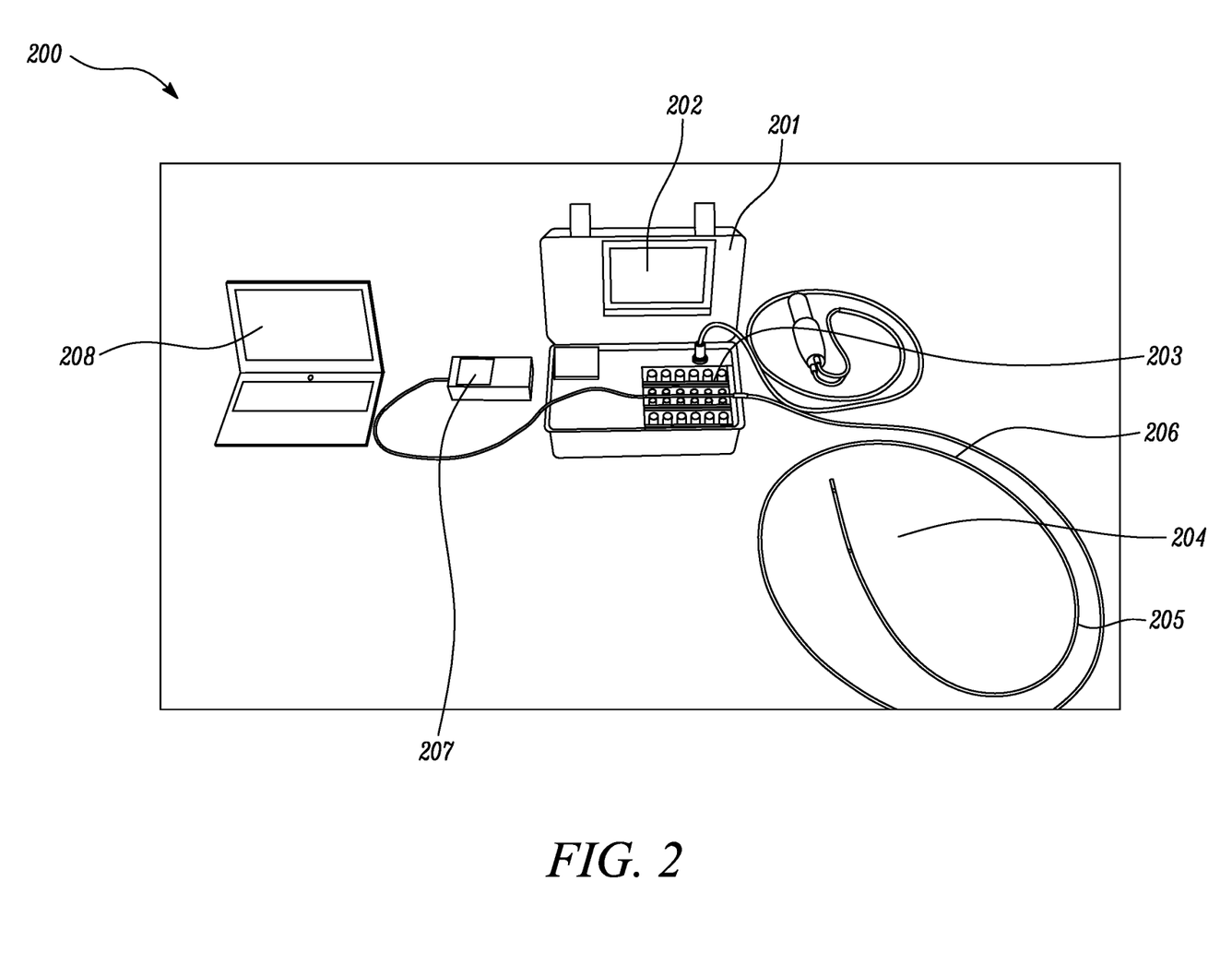
FIG. 2 presents a schematic of an example of the proposed universal actuator with the continuum arm robot of the present disclosure.

FIG. 2 shows an example of a universal actuator pack according to the present disclosure. In this the actuator pack 200 is contained within a housing 201. In this case the housing is constructed from a hard-plastic case, which is able to support the weight of the actuator components without overly increasing the weight of the actuator pack. Alternative housing may be constructed from metals or a composite or fibre reinforced material. The housing 201 is shown as having two halves that are arranged to hinge relative to each other, such that the housing can be opened to access the visual display unit 202 and the actuator circuitry 203. Other alternatives may be used such as having the visual display unit on the outside of the housing and either a single or plurality of access ports available to the operator to access the actuator circuitry 203. The continuum robot arm 204 is removably coupled to the universal actuator pack. In this case the continuum arm section only occupies a small section 205 of the continuum arm attachment. However, depending on the size arm and/or number of actuators in the universal actuator pack the continuum arm section may comprise a larger or smaller volume of the attachment. In the example shown in FIG. 2 the remainder of the continuum arm section comprises a flexible insertion tube. The insertion tube 206 is made from a material that allows it to be deformable, but rigid enough to protect the tendons that control the joints; these tendons being positioned within the core of the insertion tube. The external surface of the insertion tube may be coated in a material that is more deformable such that the insertion tube does not damage any of the components that it comes into contact with. Materials such as silicone may be used for such a purpose. The visual display unit 202 is connected to the housing. The visual display unit comprises a screen that can display any information on the operation of the universal actuator. The screen is provided with a user input device. For example, the screen may be touchscreen.

Alternatively, the screen may be provided with buttons or an external device that the user can use to control what is displayed as well as interface with the computer unit that controls the operation of the actuator device. A second user input device 206 is connected to the universal actuator pack 200. In the example shown in FIG. 2 the second user input device is a joystick. The twist and feed mechanism is a means of inserting the continuum arms through an aperture and comprise mechanism g a feed portion comprising with an associated actuator to drive the motion of the continuum arm robot and, a twist portion comprising an associate twist actuator which links with the feed portion and rotates the continuum arm about its axis.

The figure also shows some other components that may be attached to the actuator system. These components comprise a decoder box 207 for the signal from the camera that can run through the continuum arm robot section 204. This decoder is able to convert the signal from the camera system at the tip of the continuum arm robot section into a digital signal which can be processed by a computer 208 such that the positioning of the head of the continuum arm robot can be monitored if needed by an operator. In order to use the camera system the laptop needs to be supplied with a compatible visualisation software that is capable of reading the signal from the decoder.

Figure 3:
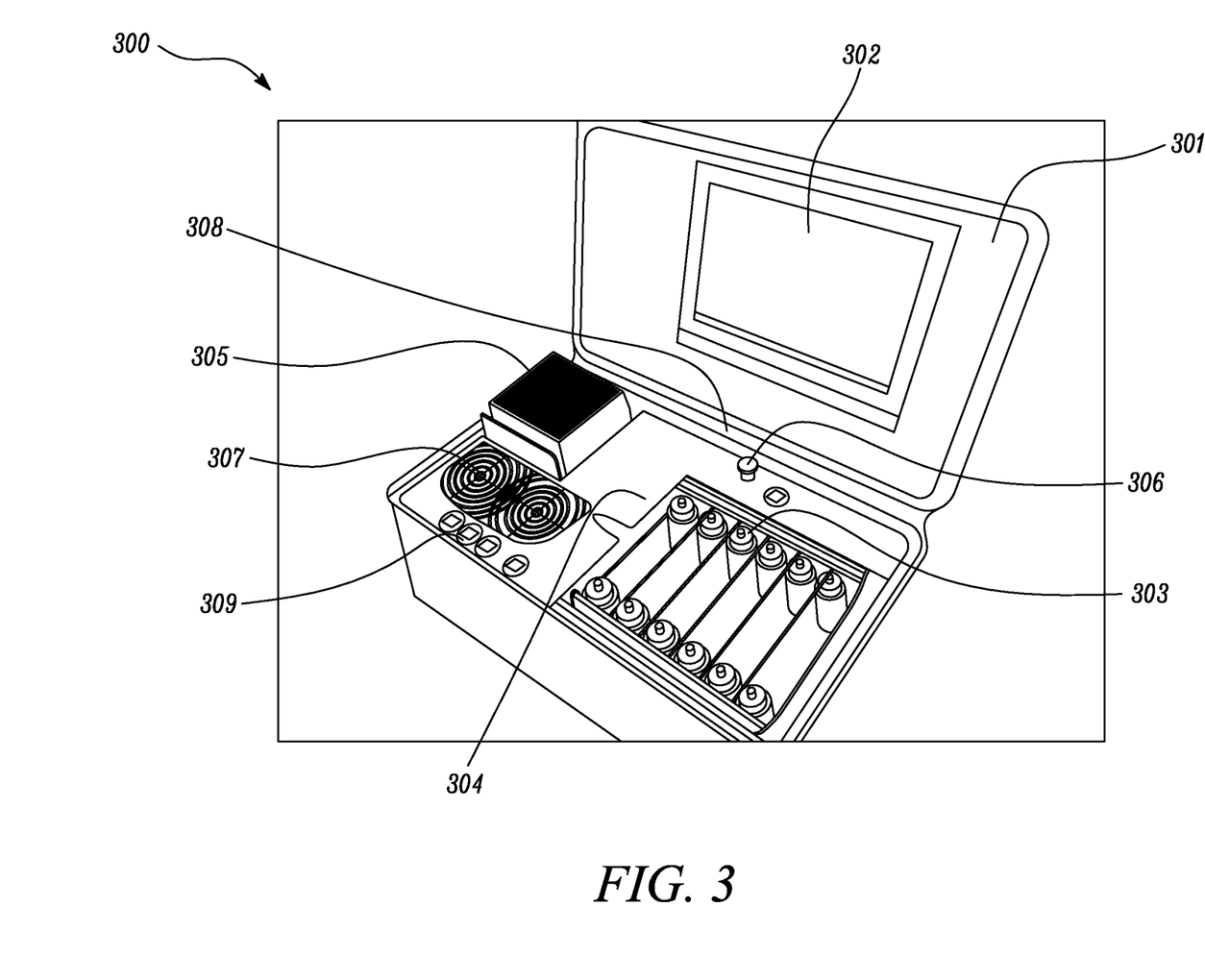
FIG. 3 presents a schematic of the of the universal actuator with the housing of the present disclosure.

FIG. 3 shows a close-up of the universal actuator 300 of the present disclosure. In this example all the components are contained within a closable housing 301. The housing being hinged such that the housing can be opened to allow for access to the visual display unit 302 and the actuator electronics 303. The actuator electronics may be protected by a removable guard 304 to protect a user and the internal electronics form injury or damage respectively. The guard can be removably attached to the housing through the use of screws, bolts or appropriate clips. Part of the visible system of the actuator electronics is the power supply pack; this comprises a power source 305, an emergency shut down button 306 and a ventilation system 307. In this example the power is supplied by an electrical cable which is coupled to a mains power supply. However, dependent upon the needs the electrical system may be powered by a battery or fuel cell. Alternatively, it can be coupled to an electrical generator or conversion system. The power supply system may be supplied with an appropriate fuse and/or a surge protector; the use of such additional components acts as further protection to the circuit and user in case of a fault with the system. The system is provided with an emergency shut down button; this acts as a kill switch to the device to rapidly shut the system down if there is a potential of the continuum arm being damaged or of the component being repaired or inspected being damaged. The shutdown button is connected to a switch in the circuit from the power supply and once pressed breaks the circuit so that no electricity can pass further into the circuit. The power system is also equipped with a ventilation system. In the example shown in FIG. 3 the ventilation system comprises at least one fan. The guard also has ventilation holes 308 for the computer and circuit boards that form the control pack. The guard is also equipped with a plurality of suitable connection ports 309, which allow external devices to be coupled to the actuator pack. The actuator pack also provides access to the bank of actuators which are used to control the tension within the tendons of the continuum arm robot. Each of the actuators within the bank are provided with a coupling mechanism to allow easy connection of the tendons of the continuum arm robot the them. The example shown in FIG. 3 comprise the use of 6 actuator pairs, however, the number of actuator pairs may be increased or decreased depending upon the complexity of the continuum arm robot section.

Figure 4:
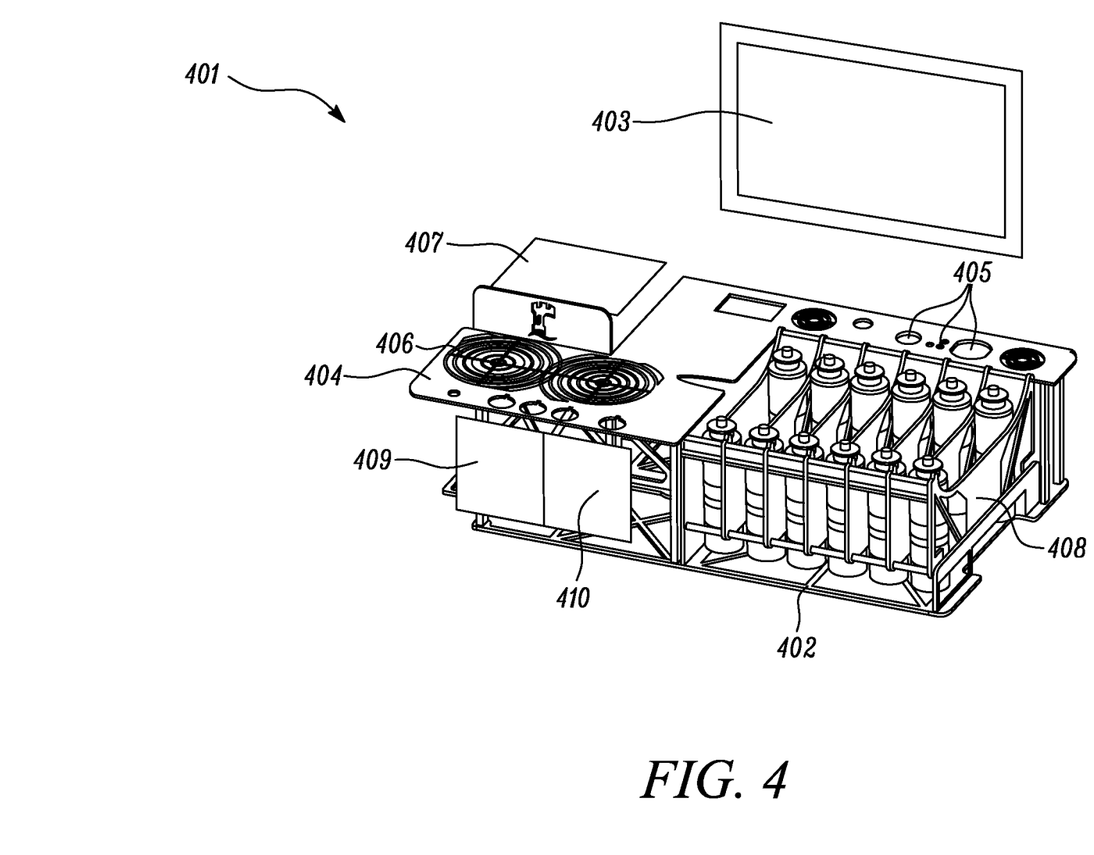
FIG. 4 presents a schematic of the of the internal components of the universal actuator without the housing of the present disclosure

FIG. 4 presents a schematic of the components within the universal actuator pack 401. The universal actuator electronics module can be mounted within the housing to a chassis 402. This chassis is capable of supporting all of the electronic components and may be provided with appropriate coupling points for equipment such as circuit boards to be mounted securely. The chassis can be made from metal or a plastic material. The choice of material will depend on the size weight and strength considerations. This is because the chassis is there to provide structural support and rigidity to the actuator such that it may be safely transported. The display unit 403 is shown as not being connected to the chassis in FIG. 4, however, depending on the size and configuration of the universal actuator the display unit may be mounted on the guard 404 or any other suitable part of the chassis. The chassis is shown being provided with the guard 404. In FIG. 4 the guard is shown having a series of holes 405, it is through these holes the ports and coupling points may be provided such that the actuator can interface with other user input devices, such as a joystick. The connectors may be USB connectors, micro USB connectors, RJ45 ports, a TFM connector port, EtherCAT (Ethernet for Control Automation Technology) output port or any other suitable input connector ports. Alternatively, these access ports may be provided for within the housing of the device. The guard may also be used the mounting point for status indicators. The status indicators can be light emitting indicators. For example, these may be a series of light emitting diodes (LEDs). The LEDs can be configured to either switch on or off in the presence of a fault or as an indication of an operating parameter such as at a certain temperature. The guard 404 may be provided with holes as part of the ventilation means 406 of the universal actuator pack 401. Also, the guard may be shaped, as shown in FIG. 4, to accommodate the power supply module 407 and to allow access to the bank of actuator pairs of the actuation pack 408. The chassis is also shown as the mounting point for the programmable logic controller (PLC) 409. The PLC is an industrial computer control system, which is capable of monitoring the function of a plurality of input devices and from the information received the PLC can make decisions through a custom program that controls the function of output devices. The input and output devices 410 may also be mounted to the chassis.

Figure 5:
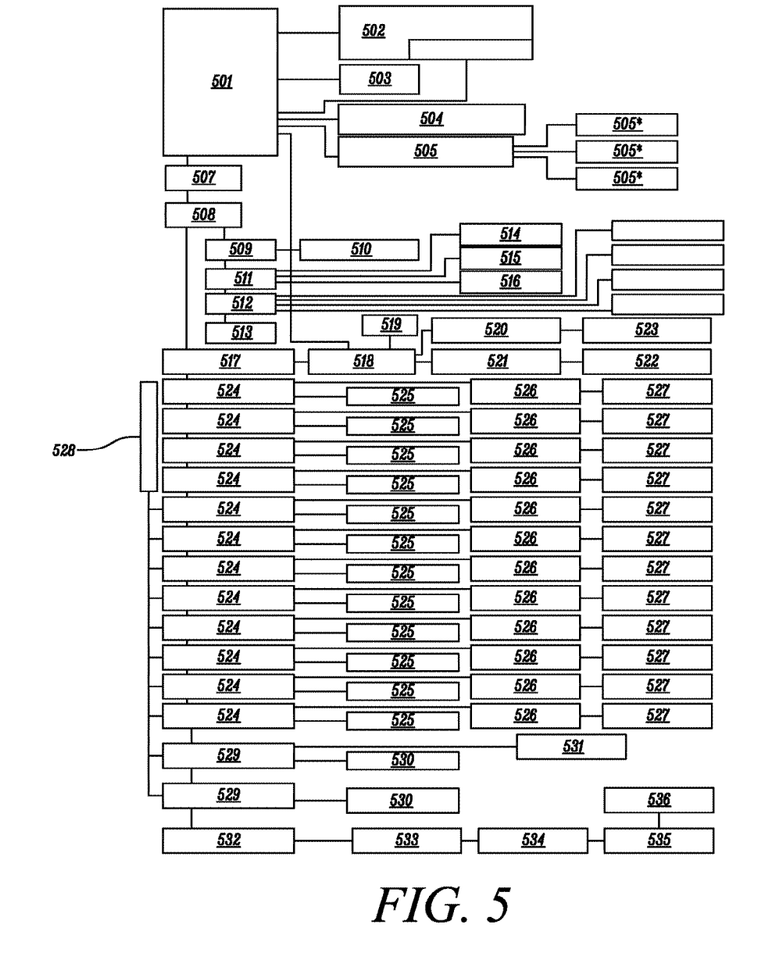
FIG. 5 presents an example of a proposed wiring diagram of the universal actuator of the present disclosure.

FIG. 5 presents a circuit diagram of an example actuator of the present disclosure. In the present example a central processing unit (CPU) 501 is used to control the actuator. The CPU can be any suitable CPU unit having the requisite processing power and memory to be able to control the snake arm and to be able to support the software and hardware associated with the device. For example, this could be a CX2030 CPU unit from Beckhoff. The CPU is connected to the visual display unit 502. This may have an output and an input link to the CPU if for example a touchscreen is used; thus, allowing the input commands from the touchscreen to be relayed back to the CPU. A network communication port 503 may also be provided. Such a port may support the use of a registered jack allowing the actuator to connect with a telecommunication network. Alternatively, or additionally a wireless device 504 may be provided to allow for wireless access to telecommunications networks. Such a device may be a wireless network card or a USB wireless adapter device, which for example can be a D-link AC 600 network adapter. To allow for connection to USB devices the CPU can be linked to a USB bus having any suitable number of ports. The skilled person will appreciate that there are a number of different configurations that would be suitably employed in such a device. The PCU is coupled in series to two Ethernet cards for control automation technology (EtherCAT) cards 507, 508. The use of these cards allows for automation of the actuators. The second EtherCAT card 508 has two connections. The first connection is provided to an incremental encoder interface 509. The incremental encoder interface is connected to a panel encoder 510 and in series to a differential twisted pair driver 511, a digital input terminal 512 and to an analogue input terminal 513. The twisted pair driver 511 being connected to an indicator LEDs 514, 515, 516. The digital input terminal 512 is connected to (what are these connections? They are 12 and 23 on the COBRA high level schematic 20-04-2020). The second connection from the ethernet cards is to a module 517 allowing the EtherCAT card to interface with a microcontroller 518. These modules may be for example EASYCAT modules. The microcontroller 518 can be any suitable microcontroller and also has a direct connection to the CPU 501. For example, the microcontroller can be an Arduino Uno microcontroller, i.e. an open-source microcontroller board based on the Microchip ATmega328P microcontroller and developed by Arduino.cc. This microcontroller is connected to an illumination indicator 519, an LED driver 520 and to a further microcontroller 521. The further microcontroller can be for example an Arduino pro mini microcontroller. This microcontroller 521 is also connected to a motion sensor; this can be an optical sensor. The LED driver is further connected to one or more LEDs. These LEDs are provided within the snake arm so a connection will need to be made when the continuum arm is changed. The module 517 is connected to a plurality of servo 518 drives that are connected to each other in series. Each servo drive is connected to its own respective actuator 519 and also to an operational amplifier 520, which is in turn connected to a respective load cell 520 for the actuator. An electronic stop 521 may also be linked to the servo drive bank. Also connected to the module in series with the servo drive is a plurality of servo twist drives 522. The twist drives are connected to their own respective actuator 523. The servo twist drives are also linked to a twist encoder. The servo drives 518 and 522 are also coupled to a user input device module 523, which is connected to a pair of micro controllers 524 which have a suitable port 525 to link to the user input device 526. The micro controllers may be an Arduino uno microcontroller. The user input device may be a joystick.

Figure 6:
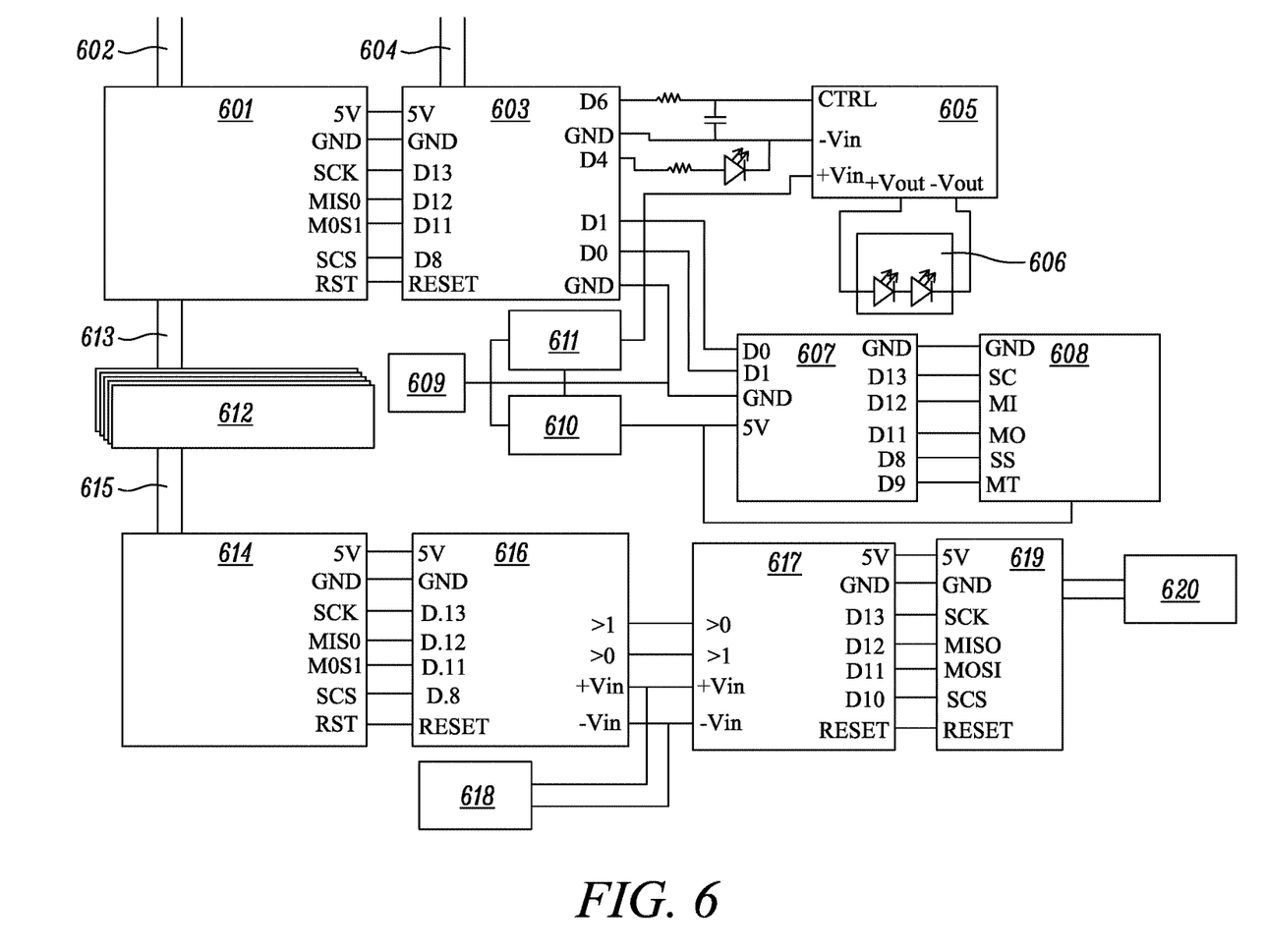
FIG. 6 presents an enlarged view of the actuator module set up used in the universal actuator of the present disclosure.

FIG. 6 presents a more detailed schematic of the control modules for the actuators. The first interface module 601, which is linked to the PCU (not shown) by a telecommunication cable 602. The module can be any suitable module. For example, this may be an Easycat module. The cable linking the module to the CPU may be any suitable communication cable. In the case of the EtherCAT module a RJ45 cable may be used. The interface module 601 is connected to a microcontroller 603. The microcontroller is connected to the interface module using any suitable connection link. The microcontroller can be any suitable microcontroller such as an Arduino Uno microcontroller. The microcontroller is shown having a connection cable 604. In FIG. 5 this connection cable is connected to an illumination indicator; however, this may be connected to any other suitable device. Depending upon the device that the microcontroller is connected to the connection cable 604 may be any suitable connection cable. The microcontroller is connected to an LED driver 605. The LED driver is used to control the light output of the LEDs 606; these LEDs are provided within the continuum arm. The LEDs are present within the continuum arm as they allow for illumination of the area surrounding the working tool. With the LEDs on the operator can clearly see what operation the device has to perform and the area surrounding the target area. The microcontroller 603 is shown further connected to a second microcontroller 607. The microcontroller 607 is connected to a motion sensor 608. The motion sensor is used to provide a detection and determination of the exact position of the continuum arm head and is able to provide feedback on the control of the continuum arm. This feedback allows accurate control of the continuum arm by detecting the location the positional results can be fed back to the controller of the actuators such that any suitable correction can be applied. The microcontroller 607, motion sensor and the LED driver 605 are powered by a voltage supply 609, with the voltage being regulated from the voltage source using voltage regulating devices 610 and 611. The voltage regulating devices may be semiconductor voltage regulating devices. The interface module 601 is connected to a plurality of servo drive modules 612 via a connection cable 613. The connection between the interface module and the servo drives may be through any suitable connection cable. The number of servo drives and subsequently the number of actuators can vary depending upon the needs for controlling the continuum arm robot. The servo drives are further connected to a second interface module 614 via an appropriate connection cable 615. This second interface module is provided to interface the actuators with a user input device. For this purpose the second interface device is connected to a microcontroller 616. The microcontroller may be any suitable microcontroller. For example, this may be an Arduino Uno microcontroller. The microcontroller 616 is linked to a further microcontroller 617. This microcontroller may be any suitable microcontroller, for example this may be an Arduino Uno microcontroller. The microcontrollers 616 and 617 are connected to a power supply 618. The microcontroller is provided with a USB host shield 619 to allow the microcontroller 618 to connect to a USB user interface device 620. In this case the user input device is a joystick.

Figure 7A:
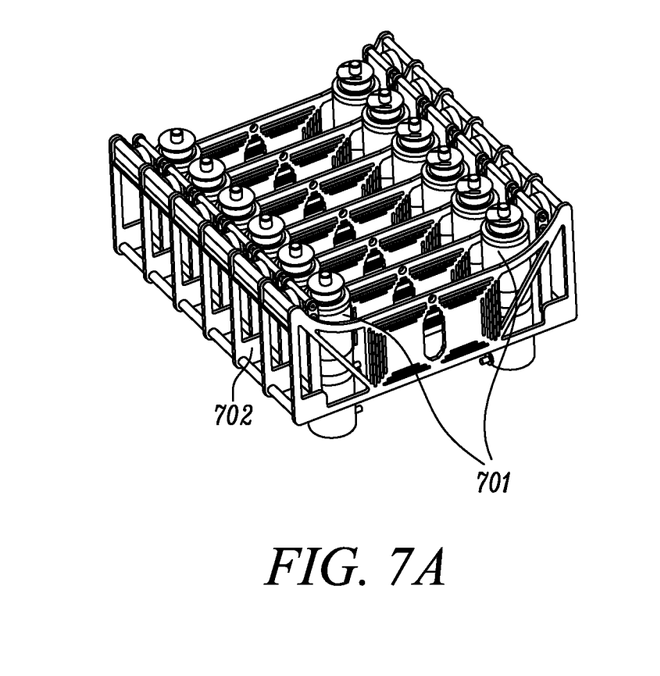
FIG. 7a presents an example of the actuator pack of the present disclosure and FIG. 7b presents an example of an actuator pair with frame of the present disclosure.
Figure 7B:
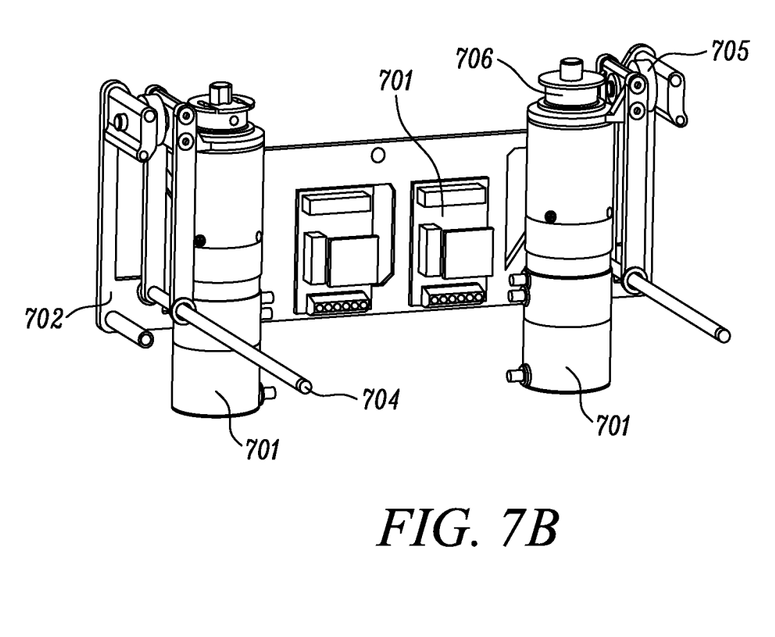

FIG. 7a presents an example of the actuator pack of the present disclosure. In this the actuators 701 are paired. The example shows that there is a collection of 6 pairs of actuators 701. (What type of actuator can be used?) The actuators must be capable of producing accurate controlled movement and sufficient torque to allow for movement of the joints within the continuum arm. The actuators can be brushless servo motors. Such servo motors provide the benefit of being lightweight, whilst still producing the torques and the accuracy of movement control that is required for accurate positioning of a continuum arm robot. Alternatively, they can be any other suitable actuator that would be apparent to the person skilled in the art. The actuators are shown linked to a modular frame 702. The use of a modular frame allows for the number of actuators required to be easily and readily adapted to accommodate the different needs of the universal actuator device. FIG. 7b presents a close up of a pair of actuators. The actuator 701 is shown mounted to the modular frame 702, which allows the actuators to be connected into a bank to form the actuator pack. The modular frame allows for the drive electronics 703 of the actuators to be located. This has the advantage of making the fixing of the electronics rigid such that the coupling of cables to the drive electronics can be done easily. The load frame also has a motor pivot 704, which allows for movement in the actuator relative to the frame. The actuator pairs are also provided with a load cell 705. The load cell is able to measure the load on the actuator and provides a signal of the relative load back to the servo drive which controls the actuator. Thus, accurate control of the actuator can be obtained. The actuators are shown having a spool 706 mounted to them. The use of the spool allows for the actuator to couple with the actuator cable of the continuum arm robot such that movement of the actuator can affect movement within the continuum arm joints. By the use of a modular actuator pack design along with the and the choice of drive electronics communication protocol allows for expansion. In particular the use of EtherCAT cards is beneficial in the modular increase in size of the universal actuator. By using the modular actuator pack and selected electronics it is possible to go from 12 tendon continuum robots, the examples of which are shown in the figures, to any number of tendons. However, this may require that adequate changes are made to the layout and dimensions of the frame. In order to incorporate a larger number of actuators it may require that the actuators are staggered so that they occupy less space. Other options for increasing the number of actuators within the setup may involve using concentric shafts for stacked pairs.

Figure 8A:
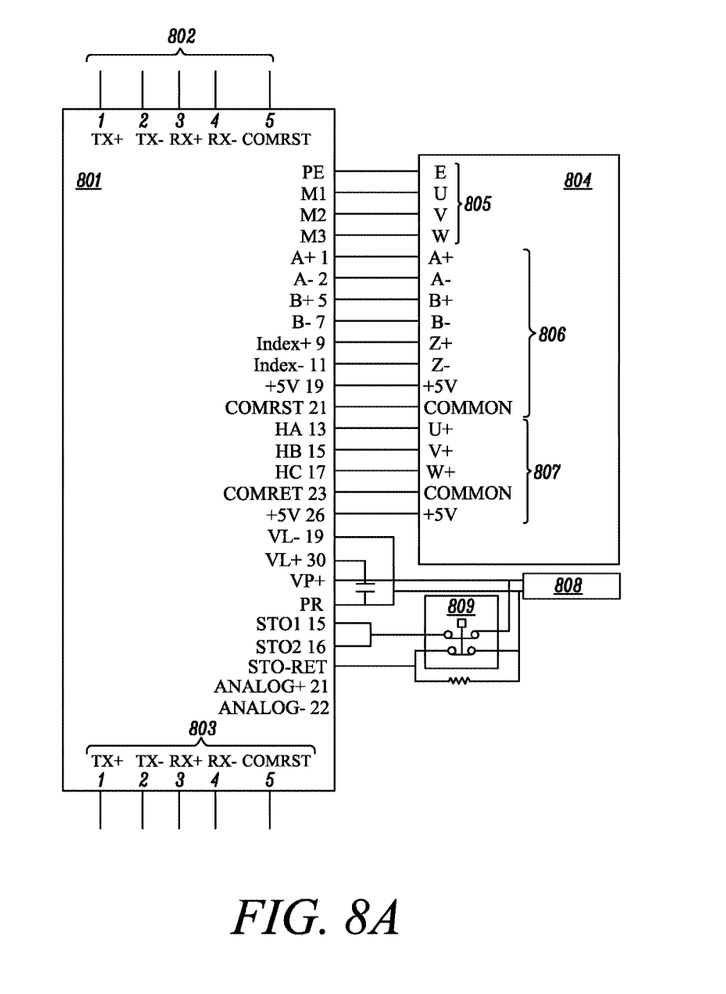
FIG. 8a presents a wiring schematic of the servo drive coupling to the an actuator of the present disclosure.
Figure 8B:
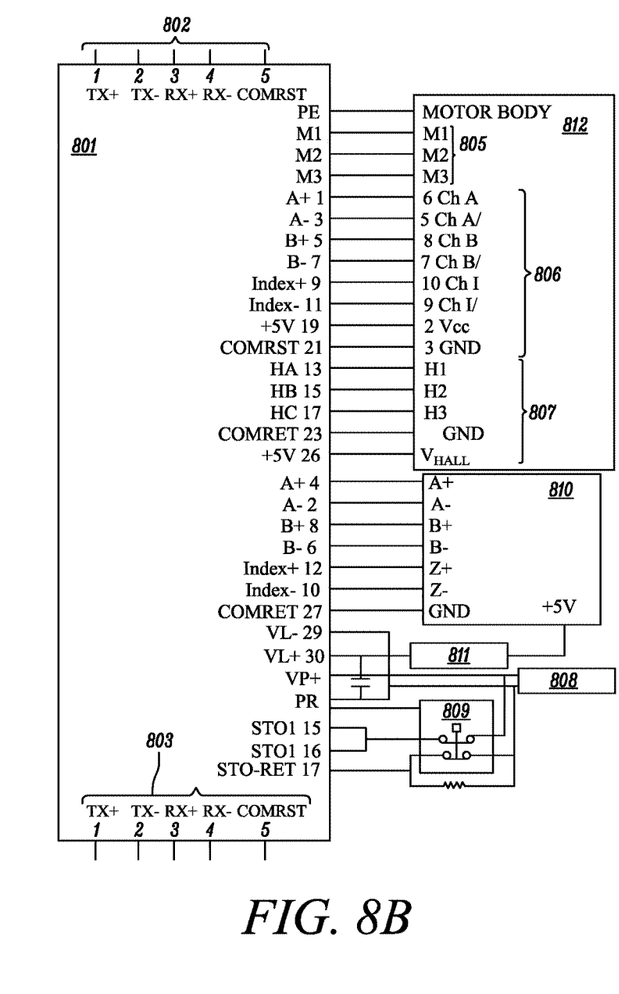
FIG. 8b presents a wiring schematic of the servo drive coupling to a twist actuator drive.

FIG. 8a presents an example of the coupling of a servo drive to a standard actuator. The digital servo drive 801 is connected to a connection module or further servo drive through the use of a cable 802. The servo drive actuator has another cable 803 provided on the board such that the drive can be coupled to another drive module or to a connection module. The servo drive actuator is connected to the actuator 804. The connection between the servo drive and the actuator is provided through three separate connection cables. Cable 805 links provides a motor connection cable. Cable 806 connects the encoder connection of the servo drive with that of the actuator. Cable 807 provides a connection for the pole sensor between the servo drive and the actuator. The servo drive is connected to a power supply 808. A turn off switch is provided between the power supply and the servo drive module. The turn off switch 809 is provided to allow for rapid shutdown of the actuator module if required. FIG. 8b presents an example of the coupling of servo drive module to the twist actuator drives. In this the servo drive 801 is coupled to either the servo drive module or a connection module through the same cables 802 and 803—the same as in FIG. 8a. The servo drive module is coupled to a rotating actuator connecting the motor cable, encoder cable and hall sensor cable in the same configuration as in FIG. 8a using cables 805, 806 and 807. The servo drive is also coupled to an incremental encoder 810. This encoder is supplied to the power supply 808, with a voltage regulator 811 being positioned between the power supply and the encoder. The twist actuator drive is also provided with a turn off switch 809.

Figure 9:
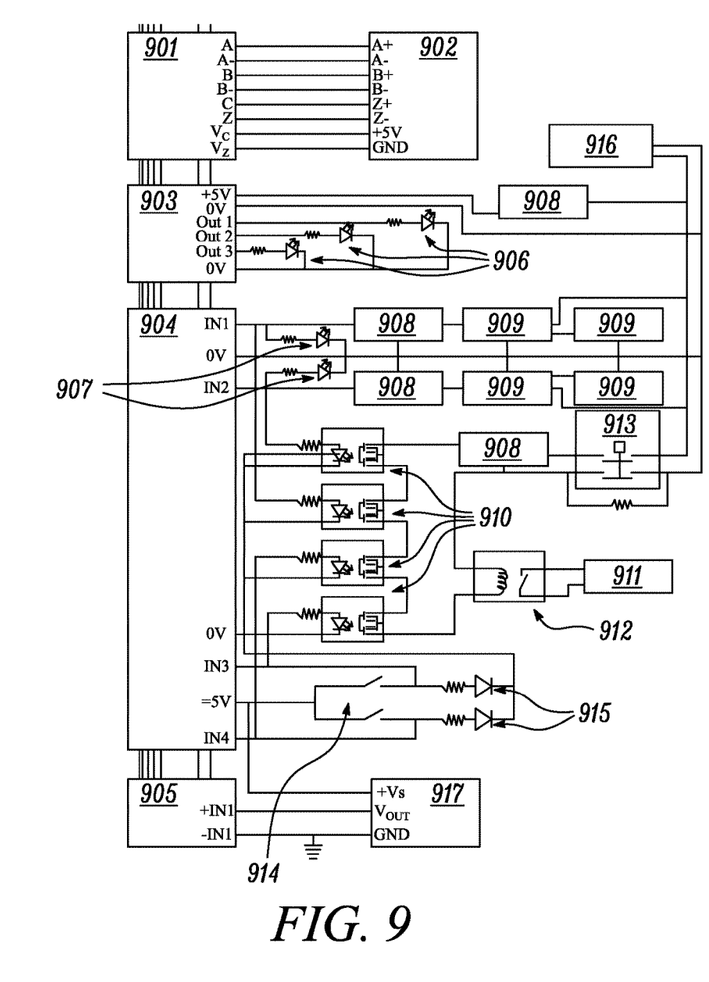
FIG. 9 presents an example of the wiring diagram of the encoder module of the present disclosure.

FIG. 9 presents an example wiring diagram of the encoder module setup of the present disclosure. In this an incremental encoder interface 901 is provided. The incremental encoder is coupled with a connection module that links the encoder to the PCU—both of which are not shown. The incremental encoder 901 is coupled to an incremental encoder 902; this connection can be done using any suitable connecting cable, which is capable of linking the appropriate connection points on the respective boards. The incremental encoder is linked in series to a 4-channel digital output 903, a 4-channel digital input 904, and an analogue input 905. The 4-channel digital is coupled to a plurality of LED lights 906, each of which are linked to the output channels. The 4-channel digital input channels 1 and 2 are coupled to LEDs 907, voltage regulators 908 and to photoelectric sensors 909, a plurality of relay devices 910 and an interlock output 911 coupled to a second relay 912. The circuit is further provided with an electronic cut-off switch 913. Inputs 3 and 4 are connected to a pair of switches 914 and diodes 915. A power supply 916 is provided to encoder circuit being coupled to the relay circuit and the voltage lines of the 4-channel digital output. A temperature sensor 917 is connected to the input lines of the analogue input. The temperature sensor 917 is also connected to the voltage line of the digital input device.

Figure 10:
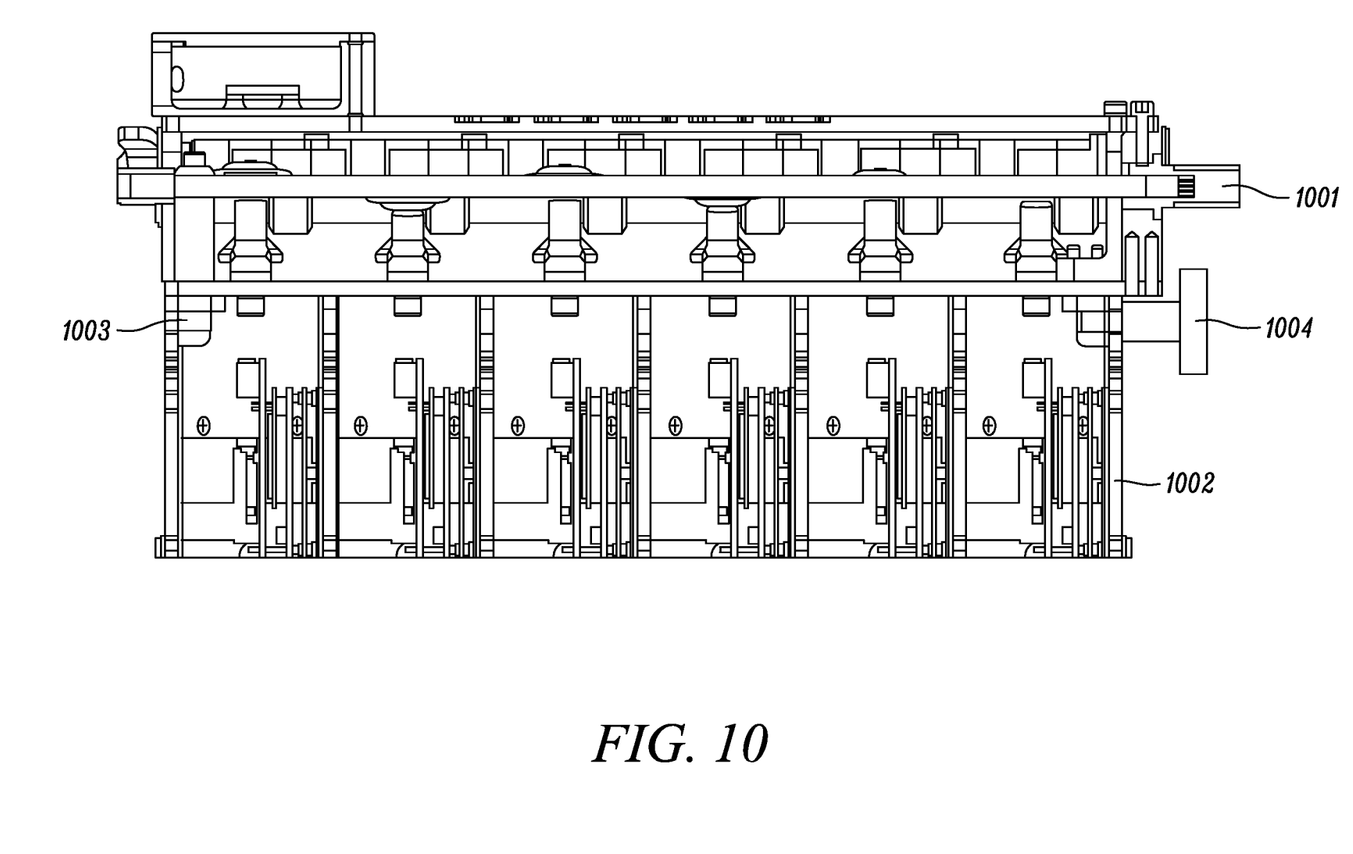
FIG. 10 presents an example of the connection of continuum arm robot to universal actuator of the present disclosure.

FIG. 10 presents an example of the connection of the continuum arm robot to the actuator. The process for coupling the continuum arm to the universal actuator pack is to rigidly connect the continuum arm portion 1001 to either the housing 1002 or to the chassis. The arm 1001 may be connected by sliding a stud 1003 onto the continuum arm base. The stud can then be positioned in an appropriate space within the housing and can be secured by a screw 1004. In the example presented in FIG. 10 the stud 1003, which is connected to the arm is positioned in the hole between servo drives and is connected to one of the module frames. Alternatively, the continuum arm section may be secured through a compression fitting, or the arm may be provided with an engagement means such as a collar with treaded holes that allow the arm to be bolted to the housing or the arm may have a pair of pins or a collar with pins that allow the arm to bayonet couple to the housing of the universal actuator pack. With the arm securely coupled to the universal actuator the tendons can be connected to its associated actuator. This may be done by means of a splined or keyed shaft that engages a splined or keyed hole during attachment of the continuum robot base. Alternatively, the process of coupling the tendons to the actuators may be done via a manual process of fixing a ferrule that is connected to the end of the tendon into a slot on the actuator. By connecting the tendons through the use of a splined of keyed hole allows for easier and quicker changes of the continuum arm robot, thus reducing the labour cost of such a change. The continuum arm may further be connected to a visual decoder unit which can be positioned in the housing. This can be done by connecting attaching an end connector of the coupler of the decoder box. This connector pairing can be any that are suitable for the transmission of a visual signal.

Figure 11:
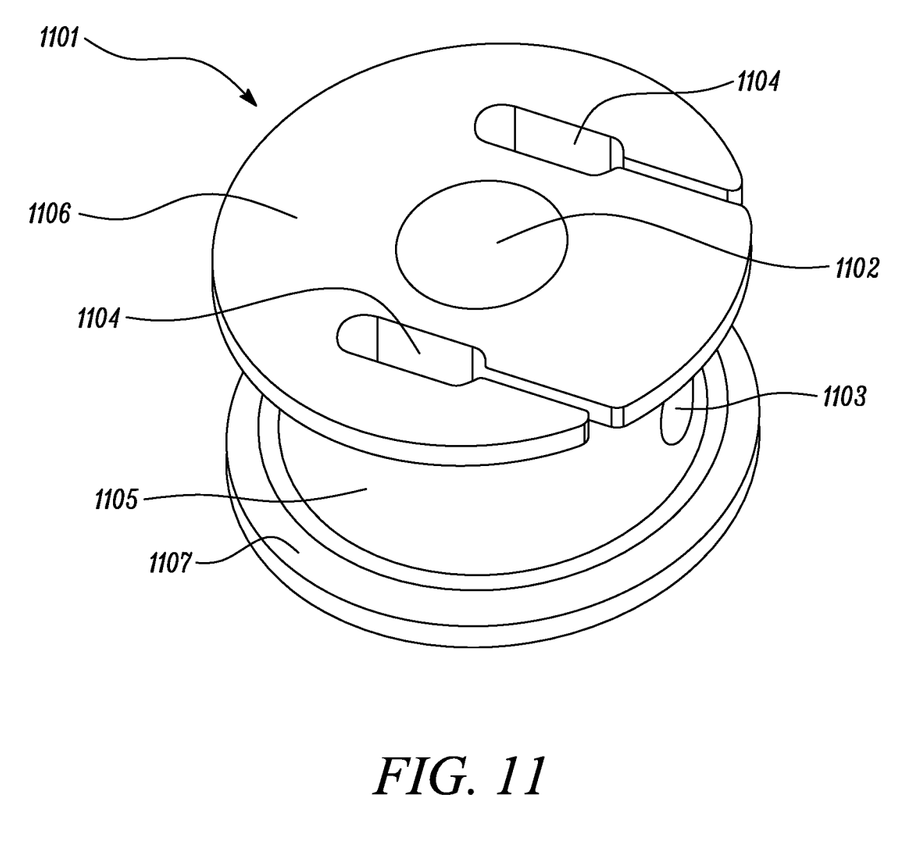
FIG. 11 presents an example of a spool for connecting the tendon to the actuator.

FIG. 11 presents an example of a spool that can be mounted onto the actuator to couple the tendons of the continuum arm robot to the actuators. Such a spool may be positioned on all of the actuators within the actuator pack. The spool 1101 comprises a central bore 1102, which is positioned onto a moveable shaft of the actuator. A hole 1103 is provided in the spool to allow a set screw to be located such that the spool can be securely connected to the shaft of the actuator. The surface of the spool is provided with a pair of slots 1104. These slots are shaped to securely connect with a ferrule that has been connected to the end of the tendon. Thus, as the shaft of the actuator moves a resultant tensioning or relaxing is provided within the tendon; this therefore allowing for accurate control over the joint on the continuum arm robot. The spool is shaped to have a narrower centre section 1105 to the top 1106 and base 1107 portions. This narrower, i.e. having a smaller circumference, section allows for the tendon to be wrapped around this section so that it is under tension when the ferule of the tendon is connected with the slot. This tensioning means increases the accuracy of control that the actuator has over the continuum arm robot.

The universal actuator may be coupled with a plurality of continuum arm robots or a single continuum arm robot. If a plurality of continuum arm robots are used they may feature heads of the robot for performing different tasks. An example of the continuum arm robot may have a tendon diameter of up to 1.2 mm. The actuator may be able to provide a driving force of up to 500 N per tendon. It is desired that the actuator provides a drive repeatability with a maximum error of 0.2 mm. The continuum arm robot may have a minimum diameter of 4 mm and may have a diameter up to a maximum of 30 mm. Such a setup may be able to support a maximum of 32 tendons. As such, the universal actuator may support up to 10 independently drivable continuum segments. The continuum arm robot may have a length of up to 10 m. By modification of the size of the housing and or the strength and size of the actuators it may be possible to increase the size of the continuum arm robot and the number and size of the tendons employed.

It will be understood that the invention is not limited to the embodiments above-described and various modifications and improvements can be made without departing from the concepts described herein within the scope of the following claims.

The invention claimed is:

1. A universal actuator for driving a continuum arm robot having a plurality of tendons, the universal actuator comprising:
   a housing;
   a power supply pack comprising a power source; and
   a control pack comprising an industrial programmable logic controller, a screen, a rotary encoder linked to an analogue input device a digital output device, a plurality of electronic control cards that connect the programmable logic controller to a user input device, the rotary encoder and an actuator pack for controlling the motion of the continuum arm robot, the programmable logic controller or the screen having a computer program to allow for set up and control of the continuum arm robot, wherein:
   the power supply pack and the control pack are located within the housing;
   the actuator pack is coupled to an electronic control card that is linked to the control pack, the actuator pack comprising a plurality of actuators, each actuator being coupled to its own load cell and servo drivers;
   the actuator pack has a connection port, the connection port having a hole through which tendons of the continuum arm robot are configured to pass through in order to be connected to their associated actuator and a coupler for allowing secure attachment and removal of the continuum arm robot; and
   each actuator of the plurality of actuators has a removable attachment configured for the tendons of the continuum arm robot.

2. The universal actuator as claimed in claim 1, wherein each actuator has a spool with a center configured for wrapping the tendon of the continuum arm robot.

3. The universal actuator as claimed in claim 1, wherein the plurality of actuators which are mounted in groups, each group being connected to a frame which also hosts the drive electronics for control of the actuator.

4. The universal actuator as claimed in claim 1, wherein the plurality of actuators are brushless servo motors.

5. The universal actuator as claimed in claim 1, wherein the load cell associated with each actuator is coupled to an operational amplifier, which is linked to the servo driver, which in turn is linked to the actuator.

6. The universal actuator as claimed in claim 1, wherein a position sensor is present to determine the location of the continuum arm robot and to provide feedback back to the programmable logic controller.

7. The universal actuator as claimed in claim 1, wherein the actuator is provided with an LED driver, the LED driver being coupled to LEDs present within the continuum arm robot to provide illumination of a desired area around a distal end of the continuum arm robot.

8. The universal actuator as claimed in claim 1, wherein the rotary encoder is a rotary incremental encoder that is linked to a encoder interface, which is linked in series to the analogue input device and to the digital output device.

9. The universal actuator as claimed in claim 1, wherein the electronic control cards are EtherCAT cards.

10. The universal actuator as claimed in claim 1, wherein the screen is a touch screen device.

11. The universal actuator device as claimed in claim 1, wherein the user input device is a joystick.

12. The universal actuator as claimed in claim 1, wherein the actuator is provided with a plurality of temperature sensors.

13. The universal actuator as claimed in claim 1, wherein the actuator is provided with a plurality of indicator LEDs.

14. The universal actuator as claimed in claim 1, wherein the universal actuator is provided with a ventilation system.

15. A continuum arm robot comprising a plurality of interchangeable continuum arm sections and a universal actuator according to claim 1.

16. The continuum arm robot as claimed in claim 15, wherein each arm is between 0.5 and 10 m in length.

17. The continuum arm robot as claimed in claim 15, wherein each arm has a thickness between 3 and 30 mm.

18. The continuum arm robot as claimed in claim 16, wherein each arm has a thickness between 3 and 30 mm.

* * * * *